United States Patent
Lee et al.

(10) Patent No.: US 8,103,636 B2
(45) Date of Patent: Jan. 24, 2012

(54) FILE STORAGE SYSTEM AND METHOD FOR MANAGING DUPLICATE FILES IN FILE STORAGE SYSTEM

(75) Inventors: Sang-Min Lee, DaeJeon (KR);
Myung-Hoon Cha, DaeJeon (KR);
Young-Kyun Kim, DaeJeon (KR);
Myung-Joon Kim, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 668 days.

(21) Appl. No.: 12/140,302

(22) Filed: Jun. 17, 2008

(65) Prior Publication Data
US 2009/0157769 A1 Jun. 18, 2009

(30) Foreign Application Priority Data
Dec. 13, 2007 (KR) .................. 10-2007-0130179

(51) Int. Cl.
*G06F 7/00* (2006.01)
*G06F 17/00* (2006.01)
(52) U.S. Cl. ......... 707/679; 707/661; 707/667; 714/769
(58) Field of Classification Search .................. 707/661, 707/667, 769, 679
See application file for complete search history.

(56) References Cited

U.S. PATENT DOCUMENTS

| 7,092,956 | B2 | 8/2006 | Ruediger |
| 7,117,246 | B2 | 10/2006 | Christenson et al. |
| 7,624,091 | B2 * | 11/2009 | Enko .................................. 1/1 |
| 2004/0143713 | A1 * | 7/2004 | Niles et al. .................... 711/162 |
| 2005/0182780 | A1 | 8/2005 | Forman et al. |
| 2007/0103984 | A1 * | 5/2007 | Kavuri et al. ............. 365/185.17 |
| 2007/0220592 | A1 * | 9/2007 | Muehlbauer ...................... 726/4 |
| 2008/0091725 | A1 * | 4/2008 | Hwang et al. .............. 707/104.1 |

FOREIGN PATENT DOCUMENTS

| KR | 10-2006-0067119 | 6/2006 |
| KR | 10-0700200 | 3/2007 |

* cited by examiner

*Primary Examiner* — Apu Mofiz
*Assistant Examiner* — Mohammad Rahman
(74) *Attorney, Agent, or Firm* — Staas & Halsey LLP

(57) ABSTRACT

Provided are a file storage system, and a method for managing duplicate files in the file storage system. The file storage system that performs file duplication for error recovery includes a client for requesting generation of a duplicate file of a new file being stored, a metadata server for storing information associated with prestored duplicate files and determining whether a file that is identical to the new file is present among the prestored duplicate files, to limit a number of identical duplicate files to a preset number, and a data server comprising a file duplication unit and a storage unit for respectively performing file duplication and file storage under the control of the metadata server. Accordingly, file recovery can be performed while duplicate files in the system are minimized.

24 Claims, 7 Drawing Sheets

FIG. 5

FILE INFORMATION MANAGEMENT TABLE 510

| FILE NAME | FILE OWNER | FILE PATH | KEY | ETC |
|---|---|---|---|---|
| data 1 | kim | /data/data1 | 1 | |
| data 1 | lee | /group/files/data1 | 2 | |
| testdata | lee | /data/testdata | 4 | |

METAFILE : /data/data1  520

| FILE SIZE | 5000 byte |
|---|---|
| NUMBER OF DUPLICATE FILES | 3 |
| BLOCK LOCATION INFORMATION | ds1/100, ds2/100, ds3/100 |
| ETC | ... |
| FILE INFORMATION MANAGEMENT TABLE REF | 1 |

METAFILE : /group/files/data1  530

| FILE SIZE | 24000 byte |
|---|---|
| NUMBER OF DUPLICATE FILES | 3 |
| BLOCK LOCATION INFORMATION | ds2/103, ds5/103, ds8/103 |
| ETC | ... |
| FILE INFORMATION MANAGEMENT TABLE REF | 2 |

METAFILE : /data/testdata  540

| FILE SIZE | 100 byte |
|---|---|
| NUMBER OF DUPLICATE FILES | 3 |
| BLOCK LOCATION INFORMATION | ds3/104, ds5/104, ds6/104 |
| ETC | ... |
| FILE INFORMATION MANAGEMENT TABLE REF | 4 |

FIG. 6

METAFILE : /data1

| | 610 |
|---|---|
| FILE SIZE | 24000 byte |
| NUMBER OF DUPLICATE FILES | 1 |
| BLOCK LOCATION INFORMATION | ds1/105 |
| ETC | ... |
| FILE INFORMATION MANAGEMENT TABLE REF | 2 |

FIG. 7

FILE INFORMATION MANAGEMENT TABLE 710

| FILE NAME | FILE OWNER | FILE PATH | KEY | ETC |
|---|---|---|---|---|
| data 1 | kim | /data/data1 | 1 | |
| data 1 | lee | /group/files/data1 | 2 | |
| testdata | lee | /data/testdata | 4 | |
| data 1 | park | /data1 | 5 | |

METAFILE : /data1  720

| FILE SIZE | 24000 byte |
|---|---|
| NUMBER OF DUPLICATE FILES | 3 |
| BLOCK LOCATION INFORMATION | ds1/105, ds2/105, ds5/105 |
| ETC | ... |
| FILE INFORMATION MANAGEMENT TABLE REF | 5 |

FILE STORAGE SYSTEM AND METHOD FOR MANAGING DUPLICATE FILES IN FILE STORAGE SYSTEM

CROSS-REFERENCE TO RELATED APPLICATIONS

This application claims priority under 35 U.S.C. §119 to Korean Patent Application No. 10-2007-130179, filed on Dec. 13, 2007, the disclosure of which is incorporated herein by reference in its entirety.

BACKGROUND OF THE INVENTION

1. Field of the Invention

The present disclosure relates to a file storage system, and more particularly, to a file storage system that can minimize duplicate files for error recovery, and a method for managing duplicate files in the file storage system.

This work was supported by the IT R&D program of MIC/IITA [2007-S-016-01, A Development of Cost Effective and Large Scale Global Internet Service Solution].

2. Description of the Related Art

In general, a file storage system provides space for storing files such as music, moving pictures, images and documents. As the file size increases due to realistic and sophisticated contents, more space is needed for file storage. Therefore, a file storage system has emerged, which can provide mass storage space by connecting multiple computers together over a network. The file storage system previously generates multiple duplicate files a file stored by a user in case of error of the stored file, thereby facilitating error recovery.

This work was supported by the IT R&D program of MIC/IITA [2007-S-016-01/A Development of Cost Effective and Large Scale Global Internet Service System].

However, the file storage system has the following limitations. When one file is stored in the file storage system, the file storage system generates a preset number of duplicate files. This does not cause any problem if the number of files being stored is mall. However, if a plurality of users stores the same file at the same time, an excessive number of duplicate files are unnecessarily stored in the system.

For example, assuming that a file storage system basically stores 3 duplicate files of one file, when 100 users store file A, total 300 duplicate files of file A are stored in the file storage system, resulting in lack of storage space and increasing a load of file maintenance and management.

SUMMARY

Therefore, an object of the present invention is to provide a file storage system and a method for managing duplicate files in the file storage system, which can minimize duplicate files.

Another object of the present invention is to provide a file storage system and a method for managing duplicate files in the file storage system, which can perform file recovery while minimizing duplicate files.

Another object of the present invention is to provide a file storage system and a method for managing duplicate files in the file storage system, which can minimize generation of duplicate files in storing a new file.

To achieve these and other advantages and in accordance with the purpose(s) of the present invention as embodied and broadly described herein, a file storage system in accordance with an aspect of the present invention includes: a client for requesting generation of a duplicate file of a new file being stored; a metadata server for storing information associated with prestored duplicate files and determining whether a file that is identical to the new file is present among the prestored duplicate files, to limit a number of identical duplicate files to a preset number; and a data server comprising a file duplication unit and a storage unit for respectively performing file duplication and file storage under the control of the metadata server.

To achieve these and other advantages and in accordance with the purpose(s) of the present invention, an apparatus a method for managing duplicate files in a file storage system in accordance with another aspect of the present invention includes: determining whether a file identical to a new file in terms of a first criterion for a quick examination of identical duplicate files is present among files each having duplicate files equal to a preset number, wherein the new file is requested to be duplicated from a client; and limiting a number of duplicate files of the file, which is identical to the new file in terms of the first criterion, to a preset number according to a result of the determination.

The method for managing duplicate files in a file storage system may further include: determining whether a file identical to the file corresponding to the entry in terms of a second criterion is present among files each having duplicate files equal to the preset number; and limiting a number of duplicate files of the file identical to the file corresponding to the entry in terms of the second criterion to the preset number according to a result of the determination.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 5 through 7 illustrate examples of a file information management table and a metafile according to the embodiment of the present invention.

DETAILED DESCRIPTION OF EMBODIMENTS

Figure 1:
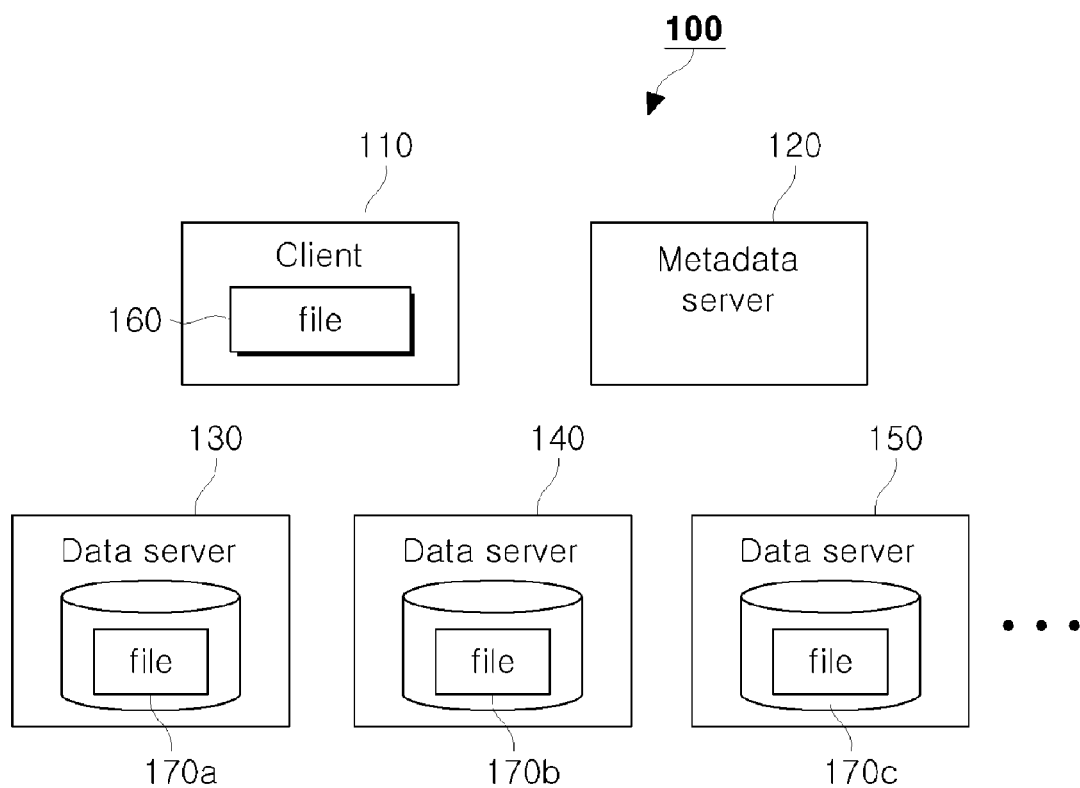
FIG. 1 is a block diagram illustrating a file storage system according to an embodiment of the present invention.

According to embodiments of the present invention, generation of duplicate files is minimized when a new file is stored in an environment where multiples storage devices are connected over network and multiple identical duplicate files are stored for the purpose of error recovery.

Hereinafter, specific embodiments will be described in detail with reference to the accompanying drawings. Like reference numerals refer to like elements throughout. Well-known functions and well-known techniques will not be described in detail to avoid ambiguous interpretation of the present invention.

FIG. 1 is a block diagram illustrating a file storage system according to an embodiment of the present invention. Referring to FIG. 1, configuration for duplicating a first file 160 and storing duplicate files of the first file 160 in first to third data servers 130 to 150 will be described.

As shown in FIG. 1, a file storage system 100 may include the data servers 130 to 150, a metadata server 120, and a client 110. In general, multiple data servers and clients are configured, and the metadata server 120 may be configured in plurality.

First to fourth files 160, 170a, 170b and 170c are identical. The second to fourth files 170a to 170c are duplicate files of the first file 160. The second to fourth files 170a may be stored in the first to third data servers 130 to 150, respectively.

In storing one file, duplicate files of the file are generated, so that the file can be recovered more easily from error.

Figure 2:
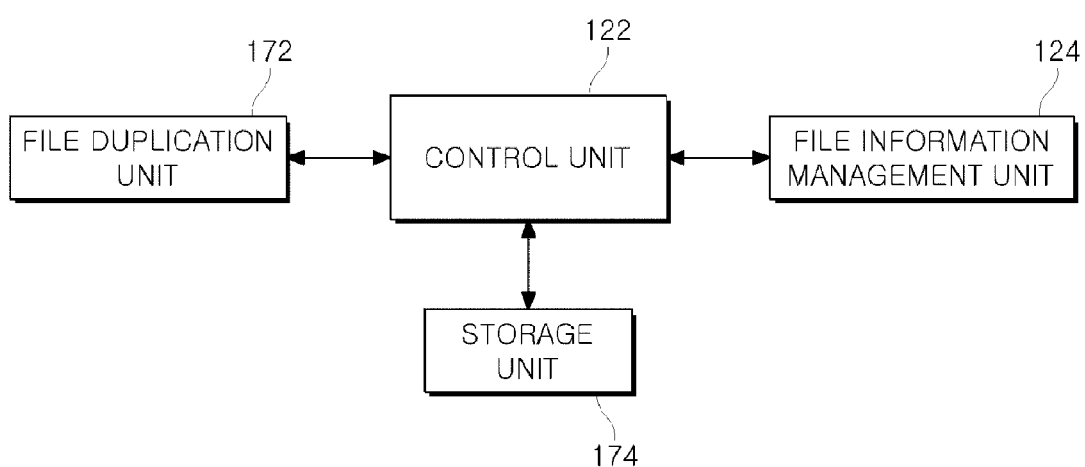
FIG. 2 is a block diagram illustrating configurations of a metadata server and a data server of FIG. 1.

FIG. 2 is a block diagram illustrating configuration of the metadata server 120 and each of the data servers 130 to 150 of FIG. 1. Referring to FIG. 2, the metadata server 120 may include a file information management unit 124 and a control unit 122. The data servers 130 and 150 each may include a file duplication unit 172 and a storage unit 174.

The file information management unit 124 includes a file information management table and meta-information associated with all of the related files. The file information management table stores information associated with files each having duplicate files equal to a preset number. Also, the file information management unit 124 may include metafiles each including information for a link to the file information management table.

The control unit 122 controls overall operation of the metadata server 120. The control unit 122 generates a metafile in response to a request for duplicate-file generation, and inspects the file information management table. Also, according to the inspection result, the control unit 122 limits a number of identical duplicate files to a preset number, thereby preventing an excessive number of identical duplicate files from being generated. For example, assuming that a file storage system generates and stores n duplicate files for each file, if inspection of the file information management table indicates that a file identical to a new file being stored is present, only one duplicate file may be stored without storing n duplicate files.

In the data servers 130 to 150, the file duplication unit 172 performs file duplication, and the storage unit 172 manages file storage.

An operation of the file storage system 100 according to the embodiment of the present invention will now be described with reference to FIGS. 3 and 4.

Figure 3:
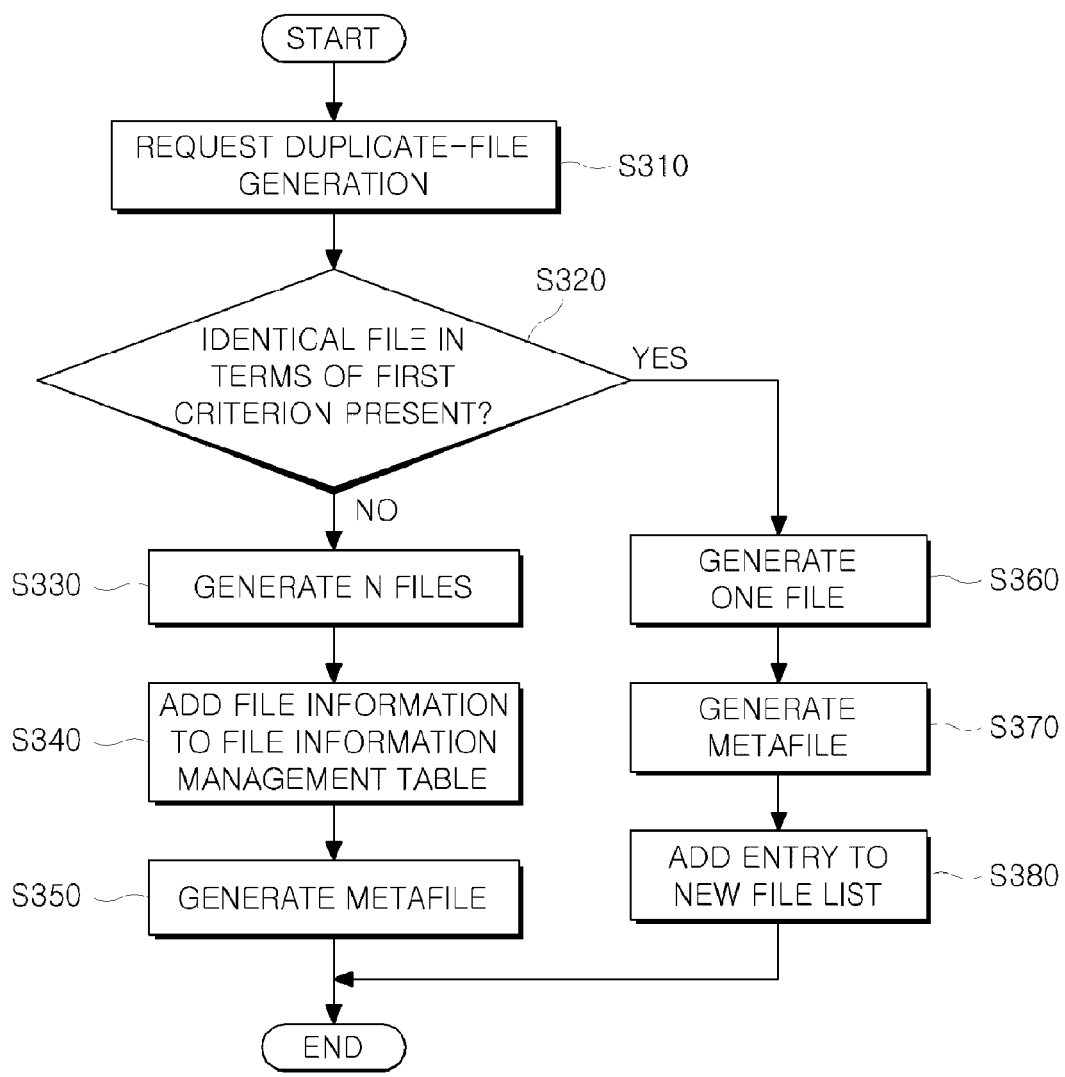
FIGS. 3 and 4 are flowcharts illustrating a method of managing duplicate files in a file storage system according to an embodiment of the present invention.
Figure 4:
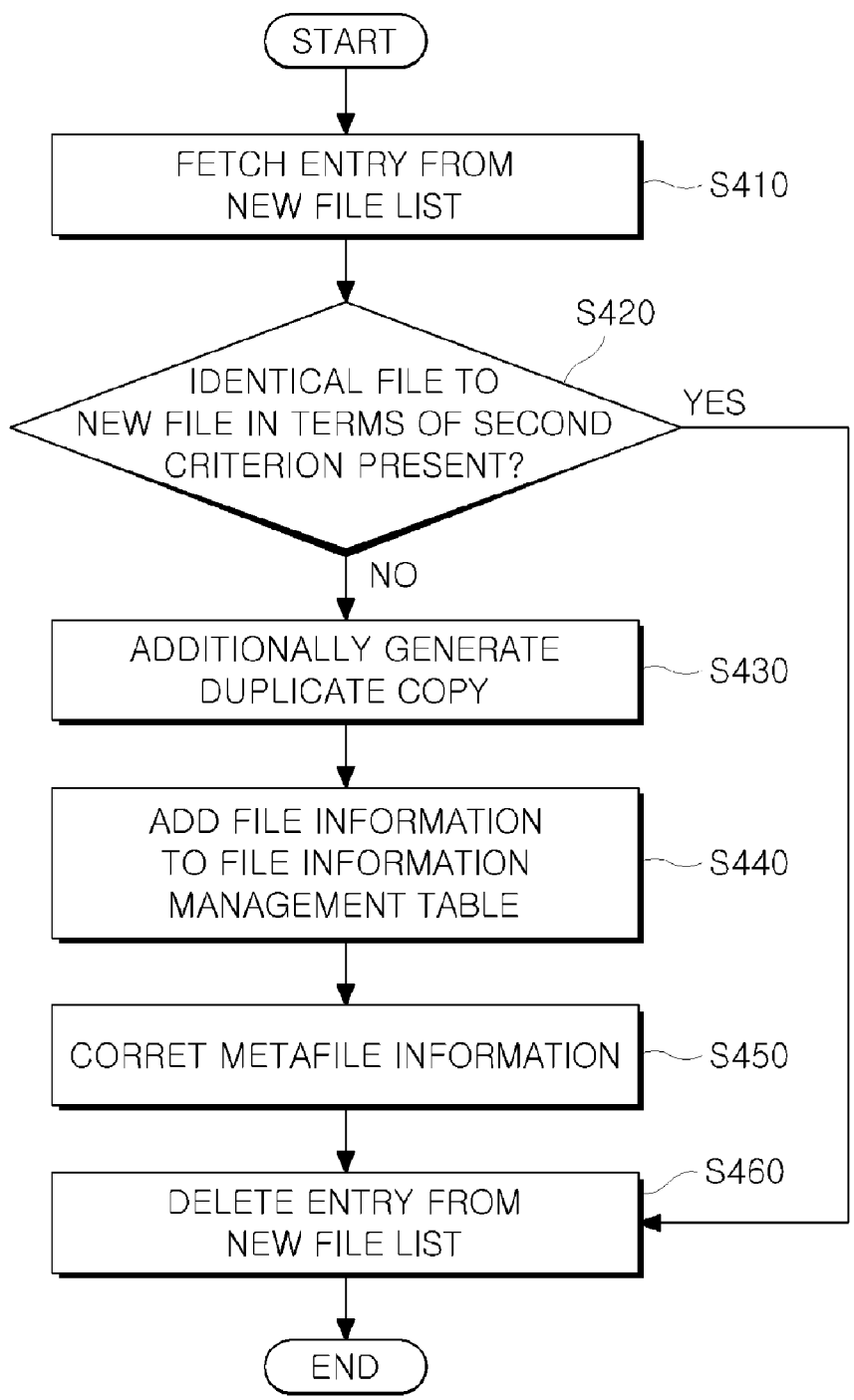

FIGS. 3 and 4 are flowcharts of a method for managing duplicate files in a file storage system according to the embodiment of the present invention. Referring also to FIGS. 1 and 2, an operation for minimizing duplicate files generated in response to a request for duplicate-file generation of a new file being stored will now be described.

In operation S310, a client 110 makes a request for generating a duplicate file of a new file being stored. In operation S320, it is determined whether a file that is identical to the new file in terms of a first criterion is present by inspecting a file information management table of the file information management unit 240. The first criterion is for a quick examination of duplicate files, and may be at least one of a file name and a file size. For example, it is determined whether a file having the same file name and file size as that of the new file has already been stored in the file information management table.

In operation S330, if there is no identical file to the new file in terms of the first criterion, the control unit 122 generates a number of duplicate files of the new file equal to a preset number. In operation S340, the control unit 122 adds information associated with the new file to the file information management table. In operation S350, an associated metafile is generated.

In operation S360, if a file identical to the new file in terms of the first criterion is present, the control unit 122 generates just one duplicate file of the new file in one of the data servers 130 to 150. In operation S370, the control unit 122 generates an associated metafile in the metadata server 120. In operation S380, the control unit lists an entry, i.e., information associated with the new file, on a new file list.

In the file information management table, files represented in one row are files each having duplicate files equal to the preset number (n) in the system 100. A file listed as an entry on the new file list is a file having only one duplicate in the system 100 without being duplicated a preset number of times. The new file list is maintained in case of errored determination of operation S320.

Processes of FIG. 4 are post-processes on files listed on the new file list in operation S380 of FIG. 3, which are performed in a background mode. The processes of FIG. 4 may be performed after a predetermined time elapses from the completion of the operation of FIG. 3.

In operation S410, the control unit 122 fetches one entry from the new file list. As mentioned above, the entry is information of a file having only one duplicate file (hereinafter, the file will be referred to as an entry file).

In operation S420, the control unit 122 determines whether, in terms of a second criterion, the entry file is identical to the file of the file information management table having duplicate files equal to the preset number and determined to be identical to the entry file in terms of the first criterion. The second criterion is used for an accurate examination of identical duplicate files, and may be data contents of the corresponding file. For example, the identity between the entry file and the file of the file information management table is determined through data comparison. In operation S320, identity between files is determined simply based on a file name and size, while in operation 420, the actual identity therebetween is determined through detailed data comparison, thereby increasing reliability of the examination of the identical duplicate files. The data comparison may be performed in the background mode because the data comparison may take a considerably long time to finish.

In operation S430, if the two files are not identical in terms of the second criterion, e.g., if the two files have the same file name and size but have different file contents, the control unit 122 additionally generates duplicate files equal to a preset number in addition to the only one previously stored duplicate file thereof. In operation S440, the control unit 122 adds information of the corresponding file to the file information management table. In operation S450, the control unit 122 corrects metafile information of the corresponding file, and in operation S460, the control unit 122 deletes the entry, i.e., the information of the corresponding file from the new file list.

In operation S460, if the two files are identical in terms of the second criterion, the control unit 122 deletes the entry from the new file list. This is because it is clear that identical duplicate files to the entry file are present in the system 100, and thus there is no need to generate new duplicate files of the new file being stored.

FIGS. 5 through 7 illustrate examples of a file information management table and a metafile according to the embodiment of the present invention. For the better understanding, the description will be made on the assumption that total 3 files of '/data/data1', /group/files/data1', and '/data/testdata/ are stored, and a preset number of duplicate files is 3. Thus, total 9 duplicate files are stored in the data servers 130 to 150, and information associated with the duplicate files is separately recorded in metafiles 520 to 540 managed by the metadata server 120. Information of the files is recorded in the file information management table 510 to be used for quick comparison with files to be stored later.

For example, by inspecting contents of the metafile 520 of the file '/data/data1', it can be seen that the file '/data/data1' has a file size of 5000 bytes and has 3 duplicate files that are stored respectively with file IDs 100 in data server 1, data server 2, and data server 3. Also, it can be seen that information of the file '/data/data1' is indicated by key value 1 in the file information management table 510.

When a request for storing a new file named '/data1' of 24000 bytes of FIG. 6 is made, the control unit 122 inspects the file information management table 510 to quickly determine the presence of an identical file to the file 'data1' of FIG. 6. The inspection of the file information management table indicates that the file information management table 510 includes two files named 'data1' in two rows, but according to a file path column, one of the two files having a metafile corresponding to '/group/files/data1' has the file size of 24000 bytes. Thus, the one file having the metafile corresponding to '/group/files/data1' is determined to be identical to the file '/data1' of FIG. 6. Accordingly, the file '/data1' of FIG. 6 can be processed according to operations S360 to S380 of FIG. 3. Thus, in a metafile 610 generated for the file '/data1', an attribute value of 'file information management table ref.' indicates a row having key value 2 in the file information management table 510. Also, a value called '/data1' can be listed on a new file list for a post-processing operation.

After a predetermined time elapses, a post-processing operation for the file '/data1' may begin in a background mode. In operation S420 of FIG. 4, the file '/data1' is compared with the file '/group/files/data1/ used as a reference in detail, thereby determining whether the two files are actually identical. If the two files are actually identical, in operation S460, an entry associated with the file '/data1' is deleted from the new file list, thereby completing the post-processing operation.

However, in operations S430 and S440, if the two files are not identical, duplicate files of the file '/data1' of FIG. 6 are additionally generated, and file information associated with the file '/data1' of FIG. 6 is added to the file information management table 510. As a result, as shown in FIG. 7, a file information management table 710 with changed contents is obtained. Thereafter, in operations S450 and S460, a new metafile 720 is obtained by correcting the metafile 610 of FIG. 6, and then the entry associated with the file '/data1' is deleted from the new file list, thereby completing the post-processing operation.

In the file storage system and the method for managing duplicate files in the file storage system, only a minimum number of duplicate files requested by the system are stored with respect to a plurality of storage requests for identical duplicate files, so that storage space can be efficiency used while allowing file recovery processing from error. Accordingly, efficiency of the system can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A file storage system that performs file duplication for error recovery, comprising:
a client for requesting generation of a duplicate file of a new file being stored; a metadata server for storing information associated with presorted duplicate files and determining whether a file that is identical to the new file is present among the presorted duplicate files, to limit a number of identical duplicate files to a preset number; and a data server comprising a file duplication unit and a storage unit for respectively performing file duplication and file storage under the control of the metadata server, wherein the metadata server comprises: a file information management unit including a file information management table for storing information associated with files each having duplicate files equal to a preset number, and metafiles including meta-information associated with all of the related files and information associated with the file information management table; and a control unit for generating a metafile in response to the request from the client and inspecting the file information management table to limit a number of identical duplicate files to the preset number.

2. The system of claim 1, wherein if a file identical to the new file in terms of a file name and a file size is present in the file information management table, the control unit controls to store only one duplicate file of the new file.

3. The system of claim 2, wherein the control unit lists an entry associated with the stored duplicate file on a new file list.

4. The system of claim 3, wherein the control unit fetches the entry and determines whether a file that is identical to the new file in terms of data is present among files each having duplicate files equal to the preset number.

5. The system of claim 4, wherein the control unit deletes the entry from the new file list if the file that is identical to the new file in terms of data is present.

6. The system of claim 4, wherein if the file identical to the new file in terms of data is not present, the control unit additionally generates a number of duplicate files of the new file equal to the preset number in addition to the one previously stored duplicate file.

7. The system of claim 6, wherein the control unit adds information associated with the new file to the file information management table, corrects metafile information associated with the new file, and deletes the entry of the new file from the new file list.

8. The system of claim 4, wherein the control unit is operated in a background mode.

9. The system of claim 1, wherein if the inspection of the file information management table indicates that a file identical to the new file in terms of the file name and size is not present, the control unit generates a number of duplicate files of the new file equal to the preset number, adds information associated with the new file to the file information management table, and generates an associated metafile.

10. A method for managing duplicate files in a file storage system, the method comprising: determining whether a file identical to a new file in terms of a first criterion for a quick examination identical duplicate files is present among files each having duplicate files equal to a preset number, wherein the new file is requested to be duplicated from a client; and limiting a number of duplicate files of the file, which is identical to the new file in terms of the first criterion, to a preset number according to a result of the determination, wherein the determining comprises: storing information associated with files each having duplicate files equal to a preset number, and metafiles including meta-information associated with all of the related files and information associated with the file information management table; and generating a metafile in response to the request from the client and inspecting the file information management table to limit a number of identical duplicate files to the preset number.

11. The method of claim 10, wherein the determining of the presence of the file identical to the new file comprises inspecting a file information management table including information associated with the files each having duplicate files equal to the preset number.

12. The method of claim 11, wherein the limiting of the number of duplicate files of the identical file to the new file comprises storing only one duplicate file of the new file if the inspecting of the file information management table indicates that the file identical to the new file in terms of the first criterion is present.

13. The method of claim 12, further comprising listing an entry associated with the stored duplicate file on a new file list.

14. The method of claim 13, further comprising;
determining whether a file identical to the file corresponding to the entry in terms of a second criterion is present among files each having duplicate files equal to the preset number; and
limiting a number of duplicate files of the file identical to the file corresponding to the entry in terms of the second criterion to the preset number according to a result of the determination.

15. The method of claim 14, wherein the limiting of the number of duplicate files of the identical file to the file corresponding to the entry comprises deleting the entry from the new file list if the file identical to the file corresponding to the entry in terms of the second criterion is present.

16. The method of claim 15, wherein the second criterion is data contents.

17. The method of claim 14, wherein the limiting of the number of duplicate files of the identical file to the file corresponding to the entry comprises additionally generating a number of duplicate files of the file corresponding to the entry equal to the preset number in addition to the one previously stored duplicate file if the file identical to the new file in terms of the second criterion is not present.

18. The method of claim 17, wherein the limiting of the number of duplicate files of the identical file to the file corresponding to the entry further comprising:
adding, to the file information management table, information associated with the file the duplication files of which are additionally generated;
correcting metafile information associated with the corresponding file; and
deleting the entry from the new file list.

19. The method of claim 14, wherein the determining of the presence of the identical file in terms of the second criterion or the limiting of the number of duplicate files of the identical file to the file corresponding to the entry is performed in a background mode.

20. The method of claim 11, wherein the limiting of the number of duplicate files of the identical file to the new file comprises generating a number of duplicate files of the new file equal to the preset number if the inspecting of the file information management table indicates that the file identical to the new file in terms of the first criterion is present.

21. The method of claim 20, wherein the limiting of the number of duplicate files of the identical file to the new file further comprises:
adding information associated with the new file to the file information management table; and
generating an associated metafile.

22. The method of claim 12, wherein the first criterion is at least one of a file size and a file name.

23. A first storage system comprising:
a file information management unit including a file information management table for storing information associated with files each having duplicate files equal to a preset number, and metafiles including meta-information associated with all of the related files and information associated with the file information management table;
a control unit for generating a metafile in response to a request for generating a duplicate file of a new file being stored from a client, and inspecting the file information management table to limit a number of identical duplicate files to the preset number;
a file duplication unit for performing file duplication under the control of the control unit; and
a storage unit for storing a file generated by the control unit.

24. A metadata server comprising:
a file information management unit including a file information management table for storing information associated with files each having duplicate files equal to a preset number, and metafiles including meta-information associated with all of the related files, and information associated with the file information management table; and
a control unit for generating a metafile in response to a request for generating a duplicate file of a new file being stored from a client and inspecting the file information management table to limit a number of identical duplicate files to the preset number.

* * * * *